(12) United States Patent
Lee et al.

(10) Patent No.: US 11,174,967 B2
(45) Date of Patent: Nov. 16, 2021

(54) RIPPER SHANK TRAILER HITCH SYSTEMS AND METHODS

(71) Applicant: Trinity Bay Equipment Holdings, LLC, Houston, TX (US)

(72) Inventors: Christopher Sean Lee, Panama City, FL (US); John Paul Leger, Baytown, TX (US); Sergio Rodriguez, Katy, TX (US); Alexander Lee Winn, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/159,250

(22) Filed: Jan. 27, 2021

(65) Prior Publication Data

US 2021/0270389 A1 Sep. 2, 2021

Related U.S. Application Data

(60) Provisional application No. 62/983,505, filed on Feb. 28, 2020.

(51) Int. Cl.
*F16L 1/032* (2006.01)
*E02F 5/32* (2006.01)
*E02F 5/10* (2006.01)

(52) U.S. Cl.
CPC ............. *F16L 1/032* (2013.01); *E02F 5/102* (2013.01); *E02F 5/32* (2013.01)

(58) Field of Classification Search
CPC ... F16L 1/032; E02F 5/102; E02F 5/32; E02F 5/106
See application file for complete search history.

(56) References Cited

U.S. PATENT DOCUMENTS

| 3,578,090 | A | * | 5/1971 | Cline | A01B 13/08 172/439 |
| 3,782,762 | A | * | 1/1974 | Nagy et al. | B60D 1/065 280/507 |
| 8,596,665 | B2 | | 12/2013 | Scharmoller et al. | |
| 10,150,402 | B2 | | 12/2018 | White et al. | |

(Continued)

FOREIGN PATENT DOCUMENTS

CN 203320583 U 12/2013
EP 2159179 A2 3/2010

OTHER PUBLICATIONS

PCT Search Report/Written Opinion for PCT/US2021/019738 dated May 7, 2021.

(Continued)

*Primary Examiner* — Tara Mayo-Pinnock
(74) *Attorney, Agent, or Firm* — Conrad J. Hsu

(57) ABSTRACT

Techniques for implementing a pipe transport system. The pipe transport system includes a tow vehicle that moves a pipe trailer on which a pipe segment is loaded, in which the pipe segment includes tubing that defines a pipe bore and a fluid conduit implemented in an annulus of the tubing, and the tow vehicle includes a ripper assembly having a ripper shank. Additionally, the pipe transport system includes a hitch assembly to be secured to the ripper shank of the tow vehicle to enable the tow vehicle to be coupled to a trailer coupler of a tongue assembly implemented on the pipe trailer.

12 Claims, 8 Drawing Sheets

(56) References Cited

U.S. PATENT DOCUMENTS

2012/0267128 A1* 10/2012 Shintani et al. ...... E02F 3/7609
　　　　　　　　　　　　　　　　　　　　　　172/1
2015/0014003 A1* 1/2015 Stratton et al. ....... E02F 9/2079
　　　　　　　　　　　　　　　　　　　　　　172/2

OTHER PUBLICATIONS

Gessner. Gessner Lewis Dozer Ripper, YouTube. Jan. 6, 2015 (Jan. 6, 2015) [retrieved 1-3, 12, 22, 23 on Apr. 13, 2021]. Retrieved from internet: <https://www.youtube.corn/watch?v=aTNBcZ7mWgY>.

* cited by examiner

RIPPER SHANK TRAILER HITCH SYSTEMS AND METHODS

CROSS-REFERENCE

The present disclosure claims priority to and benefit of U.S. Provisional Application No. 62/983,505, entitled "RIPPER SHANK TRAILER HITCH SYSTEMS AND METHODS," filed Feb. 28, 2020, which is incorporated herein by reference in its entirety for all purposes.

BACKGROUND

The present disclosure generally relates to pipeline systems and, more particularly, to a pipe transport system that may be used to transport one or more pipe segments to and/or within a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe fittings (e.g., connectors), such as a midline pipe fitting and/or a pipe end fitting. Generally, a pipe segment may include tubing, which defines (e.g., encloses) a bore that provides a primary fluid conveyance (e.g., flow) path through the pipe segment. More specifically, the tubing of a pipe segment may be implemented to facilitate isolating (e.g., insulating) fluid being conveyed within its bore from environmental conditions external to the pipe segment, for example, to reduce the likelihood of the conveyed (e.g., bore) fluid being lost to the external environmental conditions and/or the external environmental conditions contaminating the conveyed fluid.

Additionally, in some instances, a pipe transport system, which includes a tow vehicle and a pipe trailer, may be implemented and/or operated to facilitate transporting a pipe segment to and/or within a pipeline system, for example, before initial deployment and/or re-deployment of the pipe segment in the pipeline system. More specifically, in such instances, the pipe segment may be loaded onto the pipe trailer, which includes a trailer coupler implemented to be coupled to a trailer hitch to enable the tow vehicle to move (e.g., tow) the pipe trailer and, thus, the pipe segment. However, in some instances, a vehicle that could be used as a tow vehicle in a pipe transport system may not include a trailer hitch integrated with its vehicle frame, which, at least in some instances, may limit the types of tow vehicles that can be utilized in the pipe transport system and, thus, pipe transportation efficiency (e.g., flexibility) provided by the pipe transport system, for example, due to a potential tow vehicle in the field that does not include an integrated trailer hitch being swapped out for a different tow vehicle that includes an integrated trailer hitch.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe transport system includes a tow vehicle that moves a pipe trailer on which a pipe segment is loaded, in which the pipe segment includes tubing that defines a pipe bore and a fluid conduit implemented in an annulus of the tubing, and the tow vehicle includes a ripper assembly having a ripper shank. The pipe transport system additionally includes a hitch assembly to be coupled to the ripper shank of the tow vehicle to enable the tow vehicle to be secured to a trailer coupler of a tongue assembly implemented on the pipe trailer.

In another embodiment, a method of implementing a pipe transportation system includes implementing a hitch assembly to be coupled to a ripper assembly of a tow vehicle in the pipe transportation system, in which the ripper assembly is coupled to a vehicle frame of the tow vehicle and an integrated trailer hitch is not coupled to the vehicle frame, and securing the hitch assembly to a ripper shank of the ripper assembly to facilitate moving a pipe trailer of the pipe transportation system using the tow vehicle at least in part by enabling the tow vehicle to be coupled to a tongue assembly on the pipe trailer via the hitch assembly.

In another embodiment, a hitch assembly to be deployed on a tow vehicle includes a first clamp plate and a second clamp plate to be coupled around a ripper shank of the tow vehicle, in which the first clamp plate includes a first inner surface used to engage a first surface of the ripper shank when the first clamp plate is forced toward the second clamp plate to facilitate securing the hitch assembly to the ripper shank, and the second clamp plate includes a second inner surface used to engage a second surface of the ripper shank when the second clamp plate is forced toward the first clamp plate to facilitate securing the hitch assembly to the ripper shank. The hitch assembly additionally includes a pintle hitch to be coupled to a rear side of the first clamp plate and the second clamp plate to enable the hitch assembly to be coupled to a tongue assembly on a pipe trailer.

DETAILED DESCRIPTION

Figure 1:
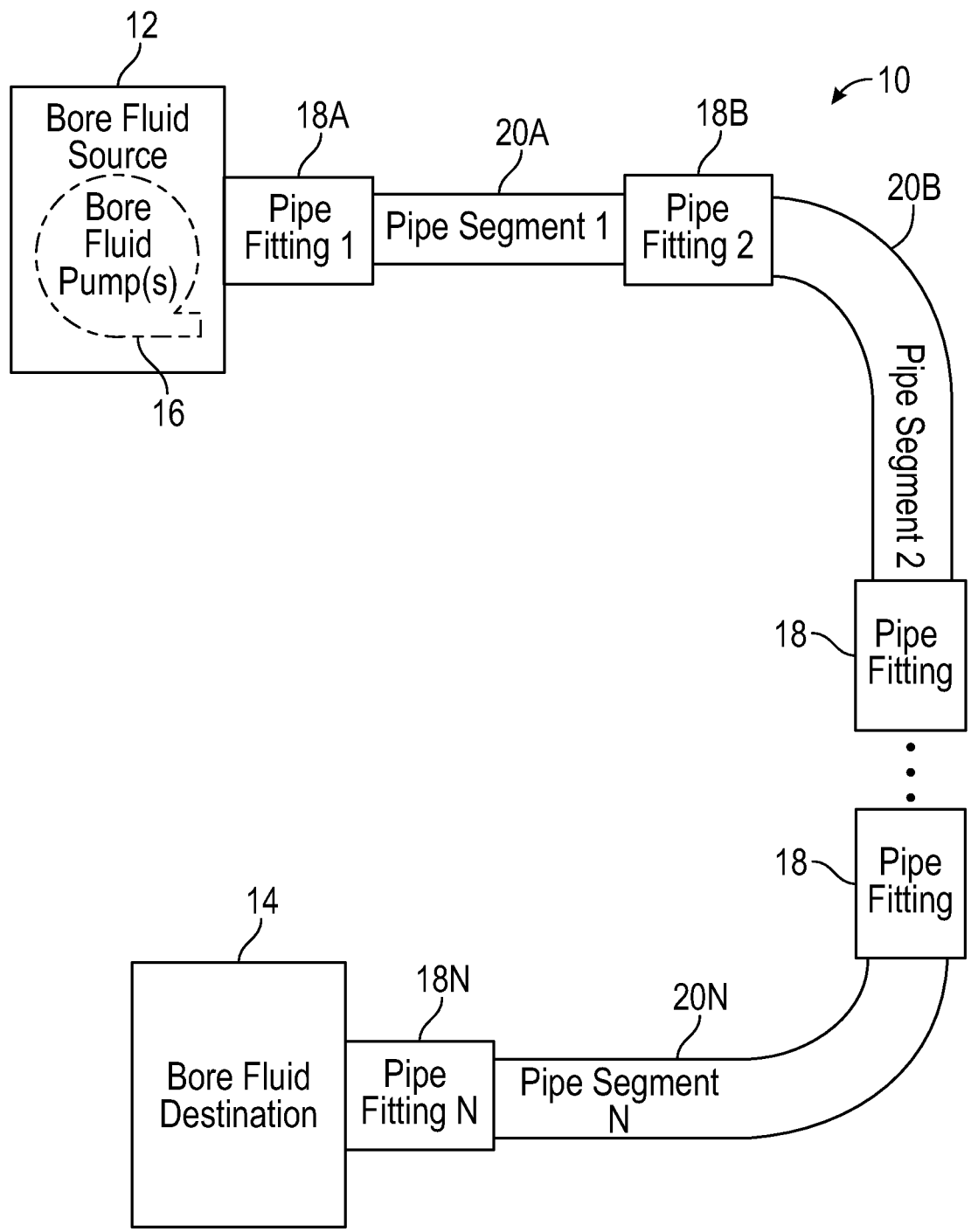
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative not limiting example, a pipeline system may include a first pipe end fitting that couples a first pipe segment to a fluid source, a midline pipe fitting that couples the first pipe segment to a second pipe segment, and a second pipe end fitting that couples the second pipe segment to a fluid destination.

Additionally, in some instances, a pipe segment may be transported to and/or within a pipeline system via a pipe transport system, for example, before initial deployment and/or re-deployment of the pipe segment in the pipeline system. In particular, the pipe transport system may include a pipe trailer on which one or more pipe segments may be loaded, for example, as coil wrapped on a pipe reel or a pipe drum. Additionally, the pipe transport system may include a tow vehicle that may be implemented and/or operated to tow (e.g., move) the pipe trailer and, thus, one or more pipe segments loaded onto the pipe trailer. To enable towing, the pipe trailer may include a tongue assembly, which includes a trailer coupler that is implemented to be coupled to a trailer hitch on the tow vehicle.

However, in some instances, a vehicle, such as a bulldozer or dozer, that could be used as a tow vehicle in a pipe transport system may not include trailer hitch integrated with its vehicle frame. For example, a dozer may instead include a blade assembly, which includes a dozer blade, coupled to a front side of its vehicle frame and a ripper assembly, which includes a ripper shank (e.g., blade), coupled to a rear (e.g., back) side of its vehicle frame. In fact, in some instances, the dozer may be used to dig a trench in which a pipe segment of a pipeline system is to be deployed and, thus, may already be in the field. Thus, at least in some instances, the lack of an integrated trailer hitch may limit pipe transportation efficiency, for example, due to the ripper assembly being removed from the dozer and a trailer hitch being welded to the dozer in its place before the dozer can be used as a tow vehicle. Moreover, at least in some instances, a welded-on trailer hitch may tend to break off from a tow vehicle, thereby potentially further limiting pipe transportation efficiency (e.g., reliability) provided by a pipe transport system.

Accordingly, to facilitate improving pipe transportation efficiency, the present disclosure provides techniques for implementing and/or deploying a trailer hitch at a tow vehicle, such as a dozer that does not otherwise include a trailer hitch. In particular, as will be described in more detail below, the techniques described in the present disclosure may facilitate deploying a hitch assembly at a ripper assembly of the tow vehicle such that a trailer hitch of the hitch assembly extends out from a ripper shank of the ripper assembly, for example, away from the rear side of the tow vehicle. In other words, the techniques described in the present disclosure may facilitate deploying a hitch assembly, which is implemented to be secured (e.g., coupled) to a tongue assembly on a pipe trailer, on a ripper shank of the tow vehicle. In some embodiments, the tongue assembly on the pipe trailer may include a trailer coupler (e.g., ring) with a vertical opening.

Thus, to facilitate securing a tongue assembly of a pipe trailer thereto, in some embodiments, a hitch assembly may include a hitch body, which has horizontal fins (e.g., a pair) that extend from a first (e.g., rear-facing) side to define a horizontal slit that is implemented to interface with a corresponding trailer coupler of the tongue assembly. In particular, to facilitate securing the hitch assembly to the tongue assembly, the hitch body may include a vertical opening that extends through each of its horizontal fins to enable a vertical (e.g., drop and/or first) pin to be inserted through and secured in the horizontal fin vertical openings as well as a corresponding vertical opening in the trailer coupler. In other words, in such embodiments, the hitch body may facilitate implementing a drop pin trailer hitch.

Additionally, to facilitate securing a hitch assembly to a tow vehicle (e.g., dozer), in some such embodiments, the hitch body of the hitch assembly may have vertical fins (e.g., a pair) that extend from a second (e.g., forward-facing and/or opposite) side to define a vertical slit that is implemented to interface with a ripper shank of the tow vehicle. In particular, to facilitate securing the hitch assembly to the ripper shank, the hitch body may include a horizontal opening that extends through each of its vertical fins to enable a horizontal (e.g., second) pin to be inserted through and secured in the vertical fin horizontal openings as well as a corresponding horizontal opening in the ripper shank. In other words, in such embodiments, the hitch assembly may be deployed at a ripper shank at least in part by forming (e.g., milling and/or drilling) a horizontal opening through the ripper shank.

However, in some instances, permanently modifying (e.g., augmenting) even a portion of a tow vehicle, such as a ripper shank of the tow vehicle, may be undesirable, for example, due to the tow vehicle and a corresponding pipe trailer being owned by different entities and/or due to forming a hole compromising the structural integrity of the ripper shank. To facilitate reducing permanent modifications to a tow vehicle, in some embodiments, a hitch assembly may be coupled to a tow vehicle via a special-purpose ripper shank, which includes a horizontal opening that is implemented to align with corresponding horizontal openings in the vertical fins of its hitch body. In particular, in such embodiments, the special-purpose ripper shank may be secured to a blade socket of a ripper assembly on the tow vehicle in place of a normal (e.g., typical) ripper shank.

In some other embodiments, to facilitate reducing permanent modifications to a tow vehicle, a hitch assembly may include clamp plates (e.g., a pair), which are implemented to be coupled externally around a ripper shank of the tow vehicle, for example, instead of via a horizontal opening formed through the ripper shank. In particular, in such embodiments, a trailer hitch, such as a pintle hitch or a drop pin hitch, may be coupled to a rear-facing side of the clamp plates and the clamp plates may be forced (e.g., compressed) towards one another such that the inner surfaces of the clamp plates engage (e.g., contact) corresponding surfaces of the ripper shank. In other words, in such embodiments, the hitch assembly may be secured to the ripper shank at least in part using the friction between the ripper shank and the inner surfaces of the clamp plates. In fact, to facilitate improving security strength, in some such embodiments, friction enhancement may be implemented on an inner surface of a clamp plate, for example, at least in part by implementing teeth (e.g., serrations) that extend out from the inner surface of the clamp plate and/or coating (e.g., covering and/or spraying) the inner surface of the clamp plate with a material that provides a higher friction coefficient than the base material of the clamp plate.

Additionally, to facilitate compressing its clamp plates and, thus, securing a hitch assembly to a tow vehicle (e.g., dozer), in some such embodiments, the hitch assembly may include one or more clamping fastener openings that extend through each of the clamp plates to enable a corresponding threaded clamping fastener, such as a bolt, that is inserted therethrough to be selectively tightened. In particular, in such embodiments, tightening the threaded clamping fastener may exert force on the clamp plates that acts to force (e.g., push) the clamp plates toward one another, thereby causing the inner surfaces of the clamp plates to engage the ripper shank and, thus, the hitch assembly to be selectively secured to the tow vehicle. On the other hand, loosening the threaded clamp fastener may enable the clamp plates to move away from one another, thereby enabling the inner surface of the clamp plates to disengage from the ripper shank and, thus, the hitch assembly to be selectively removed from the tow vehicle. In fact, such embodiments may enable the hitch assembly to be secured at different locations on the ripper shank, for example, to facilitate aligning the hitch assembly with a corresponding tongue assembly.

To facilitate further improving the strength with which it is secured to a tow vehicle, in some such embodiments, the hitch assembly may additionally include one or more friction fastener openings that each extends through a clamp plate to enable a corresponding threaded friction fastener, such as a set screw (e.g., a die point screw, a dog point screw, a rolled point screw, a cupped point screw, a round point screw, or the like), that is inserted therethrough to be selectively tightened. In particular, in such embodiments, tightening the threaded friction fastener may cause the head of the threaded friction fastener to pass through a corresponding friction fastener opening in the clamp plate and engage a surface of the ripper shank, thereby increasing the friction between the hitch assembly and the ripper shank and, thus, facilitate further reducing the likelihood of the ripper shank hitch assembly moving relative to the ripper shank. Additionally or alternatively, in some such embodiments, the ripper shank hitch assembly may include one or more spacer plates, which are implemented to be coupled between the clamp plates such that, when the clamp plates initially engaged with a ripper shank, an open space is left between the clamp plates and the spacer plates. In particular, in such embodiments, a spacer plate may be coupled between the clamp plates to facilitate distributing forces exerted on a clamp plate more evenly (e.g., uniformly) across the clamp plate, for example, at least in part by reducing the likelihood that a first portion of the clamp plate is forced substantially (e.g., significantly) closer to the other clamp plate compared to a second (e.g., different) portion of the clamp plate.

In this manner, the techniques described in the present disclosure may facilitate implementing and/or deploying a trailer hitch at a tow vehicle, such as a dozer, that does not otherwise include a trailer hitch, which, at least in some instances, may facilitate improving pipe transportation efficiency (e.g., flexibility and/or reliability) to and/or within a pipeline system, for example, at least in part by increasing the types of vehicles that may be used as a tow vehicle in a pipe transport system and/or reducing the likelihood of a trailer hitch breaking off from the tow vehicle. In fact, in some embodiments, a ripper assembly of a tow vehicle may include one or more actuators (e.g., hydraulic cylinders), which are implemented and/or operated to move its ripper shank. Thus, in such embodiments, the one or more actuators of the ripper assembly may additionally be used to move a hitch assembly coupled to the ripper shank and, thus, a pipe trailer coupled to the hitch assembly, which, at least in some instances, may facilitate further improving pipe transport efficiency to and/or within a pipeline system, for example, by enabling the pipe trailer and, thus, one or more pipe segments loaded onto the pipe trailer to be moved while the tow vehicle itself remains stationary.

To help illustrate, an example of a pipeline system 10 is shown in FIG. 1. As in the depicted example, the pipeline system 10 may be coupled between a bore fluid source 12 and a bore fluid destination 14. Merely as an illustrative not limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
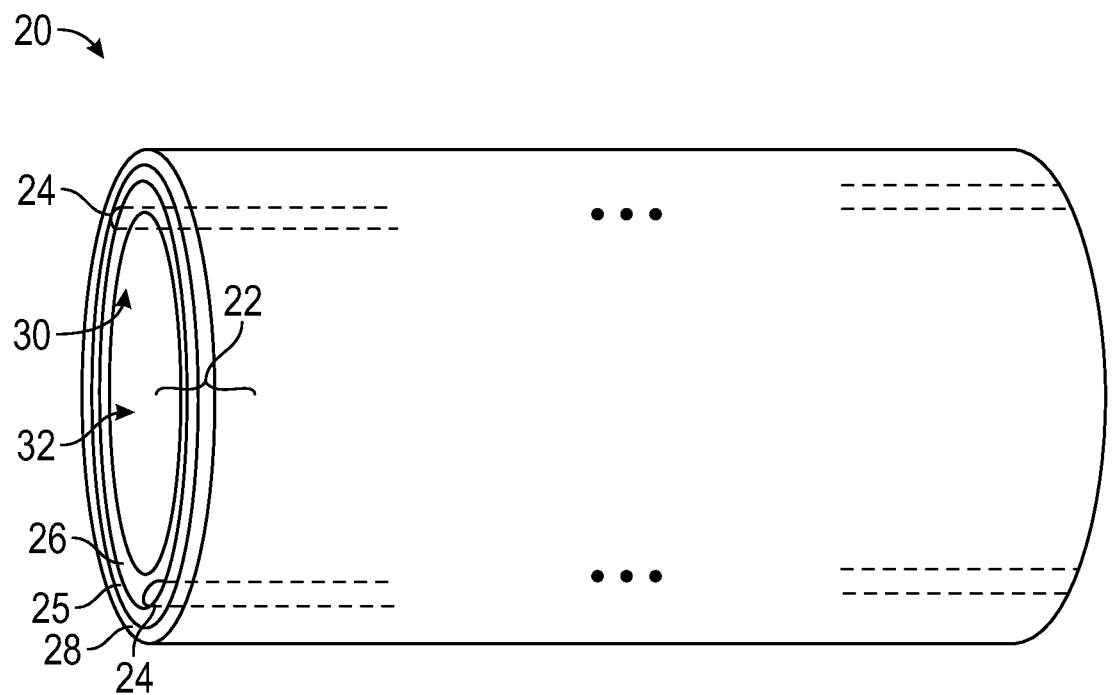
FIG. 2 is a side view of an example of a pipe segment of FIG. 1 that includes a bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
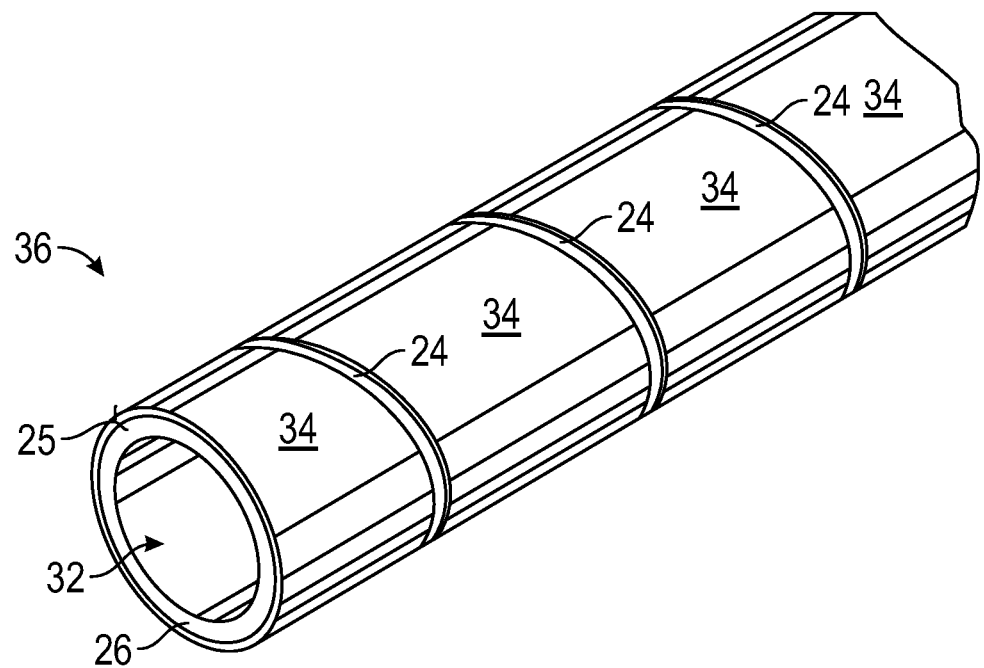
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34. In any case, as described above, one or more pipe segments 20 may be transport to and/or within a pipeline system 10 via a pipe transport system, for example, before initial deployment and/or re-deployment of the one or more pipe segments 20 in the pipeline system 10.

Figure 4:
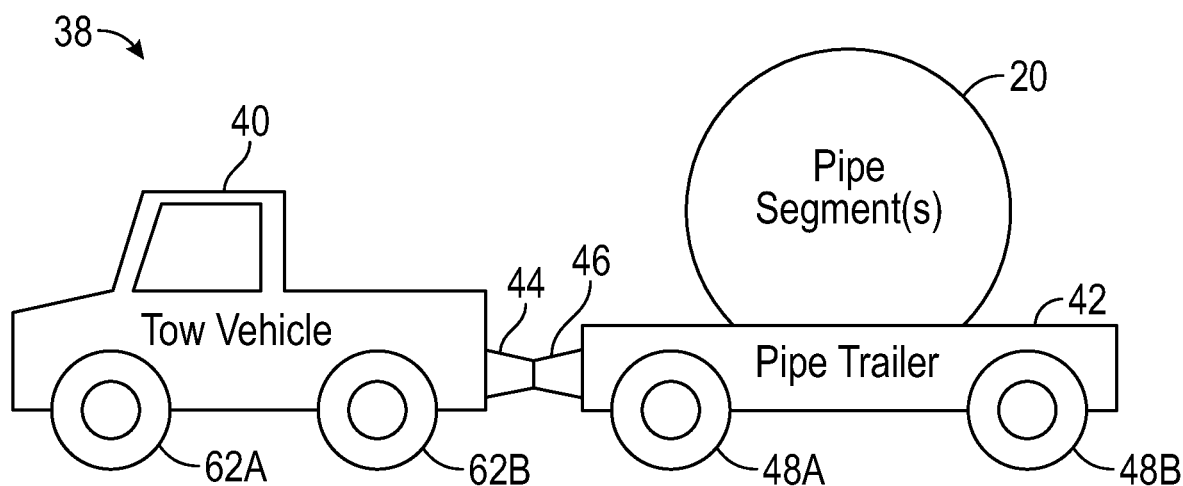
FIG. 4 is block diagram of an example of a pipe transport system, which includes a tow vehicle and a pipe trailer, in accordance with an embodiment of the present disclosure.

To help illustrate, an example of a pipe transport system 38, which may be implemented and/or operated to transport one or more pipe segments 20, is shown in FIG. 4. As depicted, the pipe transport system 38 includes a tow vehicle 40 and a pipe trailer 42. In particular, as depicted, the tow vehicle 40 and the pipe trailer 42 are coupled together via a hitch assembly 44 on the tow vehicle 40 and a tongue assembly 46 on the pipe trailer 42.

In addition to the tongue assembly 46, as in the depicted example, the pipe trailer 42 may include one or more trailer wheels 48. In particular, in the depicted example, the pipe trailer 42 includes a first trailer wheel 48A and a second trailer wheel 48B, for example, in addition to a third trailer wheel 48 opposite the first trailer wheel 48A and a fourth trailer wheel 48 opposite the second trailer wheel 48B. However, it should be appreciated that the depicted example is merely intended to be illustrative and not limiting. For example, in other embodiments, one or more trailer wheels 48 may instead be implemented as part of a trailer track assembly. In any case, as depicted, one or more pipe segments 20 may be loaded onto the pipe trailer 42.

Figure 5:
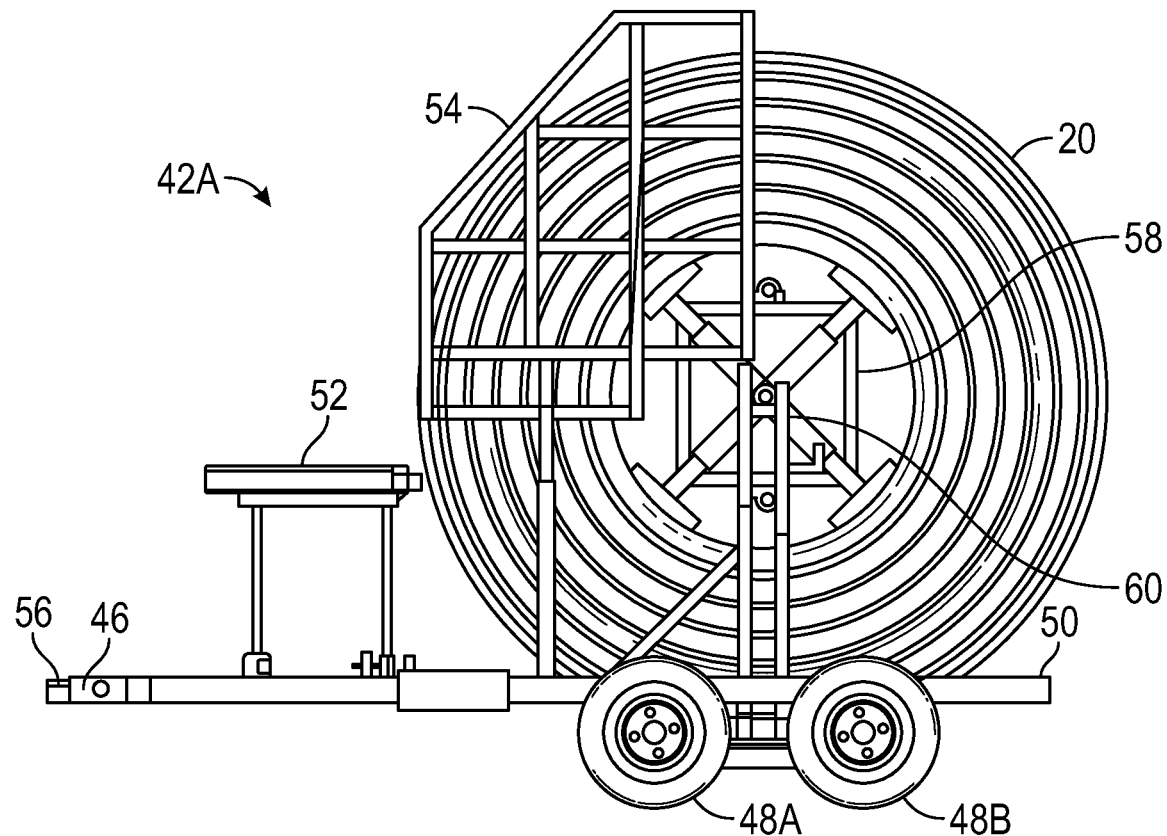
FIG. 5 is a side view of an example of the pipe trailer of FIG. 4, in accordance with an embodiment of the present disclosure.

To help further illustrate, an example of a pipe trailer 42A, which is loaded with one or more pipe segments 20, is shown in FIG. 5. As depicted, the pipe trailer 42A includes a brake assembly 52, a containment cage 54, a tongue assembly 46, a first trailer wheel 48A, and a second trailer wheel 48B coupled to its trailer frame 50. In particular, as depicted, the tongue assembly 46 includes a trailer coupler 56, which is implemented to be coupled to a trailer hitch in a corresponding hitch assembly 44. Additionally, as depicted, the one or more pipe segments 20 are coiled (e.g., wrapped) on a pipe drum 58, which is coupled to a hook 60 that extends out (e.g., up) from the trailer frame 50.

However, it should be appreciated that the depicted example is merely intended to illustrative and not limiting. In particular, in other embodiments, one or more pipe segments may be coiled on a pipe reel instead of a pipe drum 58. Alternatively, in other embodiments, one or more straight pipe segments 20 may be loaded onto a pipe trailer 42. Additionally, in other embodiments, a pipe trailer 42 may not include a brake assembly 52 and/or a containment cage 54.

In any case, as in the example pipe transport system 38 of FIG. 4, a tow vehicle 40 may include one or more vehicle wheels 62. In particular, in the depicted example, the tow vehicle 40 includes a first vehicle wheel 62A and a second vehicle wheel 62B, for example, in addition to a third vehicle wheel 62 opposite the first vehicle wheel 62A and a fourth vehicle wheel 62 opposite the second vehicle wheel 62B. However, it should again be appreciated that the depicted example is merely intended to be illustrative and not limiting. In particular, in other embodiments, one or more vehicle wheels 62 may instead be implemented as part of a vehicle track assembly.

Figure 6:
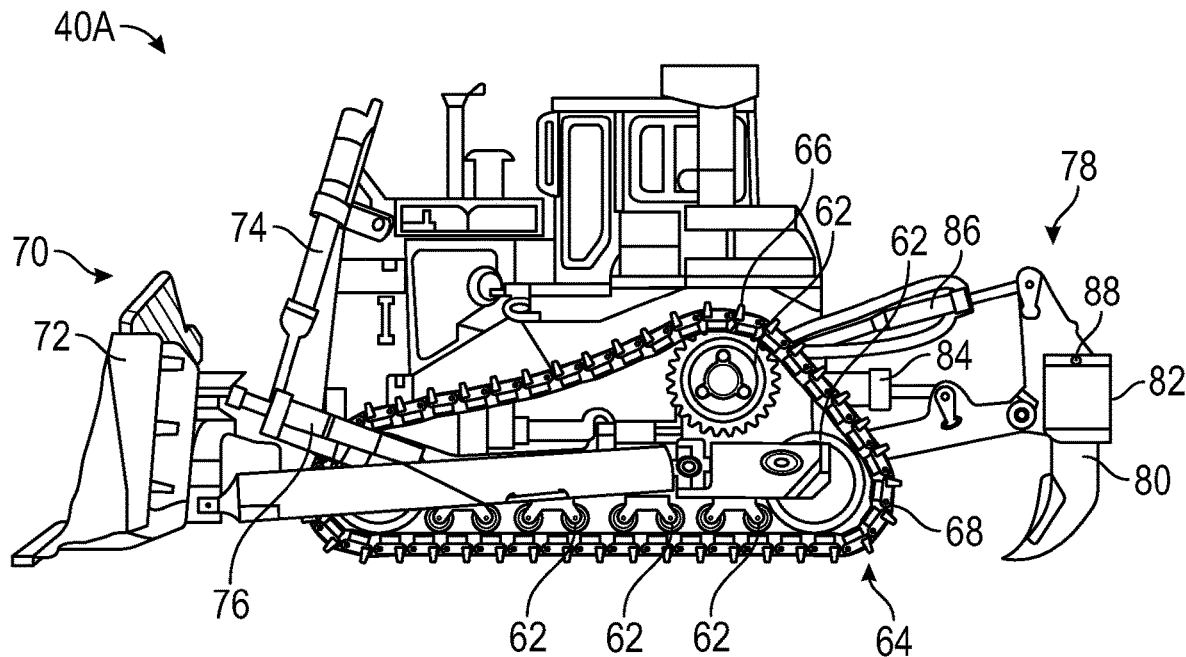
FIG. 6 is a side view of an example of the tow vehicle of FIG. 4, in accordance with an embodiment of the present disclosure.

To help illustrate, an example of a tow vehicle (e.g., dozer) 40A, which includes a vehicle track assembly 64 coupled to its vehicle frame 66, is shown in FIG. 6. As depicted, the vehicle track assembly 64 includes a track belt 68 and multiple vehicle wheels 62, which are implemented within the track belt 68. As such, actuation (e.g., rotation) of one or more of the vehicle wheels 62 may drive movement of the track belt 68 and, thus, movement of the tow vehicle 40A.

Additionally, as depicted, a blade assembly 70 is coupled to a front side of the tow vehicle 40A. In particular, as in the depicted example, the blade assembly 70 may include a dozer blade 72, a blade lift actuator (e.g., hydraulic cylinder) 74, and a blade tilt actuator (e.g., hydraulic cylinder) 76. Furthermore, as depicted, a ripper assembly 78 is coupled to a rear (e.g., back) side of the tow vehicle 40A. In particular, as in the depicted example, the ripper assembly 78 may include a ripper shank 80, a shank socket 82, a shank lift actuator (e.g., hydraulic cylinder) 84, and a shank tilt actuator (e.g., hydraulic cylinder) 86.

However, it should be appreciated that the depicted example is merely intended to be illustrative and not limiting. In particular, in other embodiments, a tow vehicle 40 may not include a blade assembly 70. Additionally or alternatively, in other embodiments, a ripper assembly 78 of a tow vehicle 40 may not include a shank lift actuator 84 and/or a shank tilt actuator 86.

In any case, as in the depicted example, the ripper shank 80 may be secured in the shank socket 82 of the ripper assembly 78 via a shank pin 88 inserted through and secured in an opening in the shank socket 82 and a corresponding opening in the ripper shank 80. Additionally, as in the depicted example, in some instance, a tow vehicle 40 may not include a trailer hitch—let alone a trailer hitch integrated with its vehicle frame 66, for example, since the space at which a trailer hitch could otherwise be implemented is taken up by its ripper assembly 78. In other words, to integrate a trailer hitch with the vehicle frame 66 in such instances, the ripper assembly 78 may be disconnected (e.g., removed) from the vehicle frame 66 and the trailer hitch may then be welded to the vehicle frame 66 in its place.

However, disconnecting a ripper assembly 78 from a tow vehicle 40 is often a resource intensive process, for example, due at least in part to the size and/or weight of the ripper assembly 78. In other words, at least in some instances, implementing a trailer hitch on a tow vehicle 40 at least in part by removing a ripper assembly 78 and welding the trailer hitch to the vehicle frame 66 in its place to enable the tow vehicle 40 to be used in a pipe transport system 38 may limit the pipe transportation efficiency provided by the pipe transport system 38. Moreover, at least in some instances, a trailer hitch welded to a tow vehicle 40 may tend to break off, thereby further limiting the pipe transportation efficiency (e.g., reliability) provided by the pipe transport system 38. Thus, to facilitate improving pipe transportation efficiency, the present disclosure provides techniques for implementing a hitch assembly 44 that may be selectively coupled to a ripper shank 80 of a tow vehicle 40.

Figure 7:
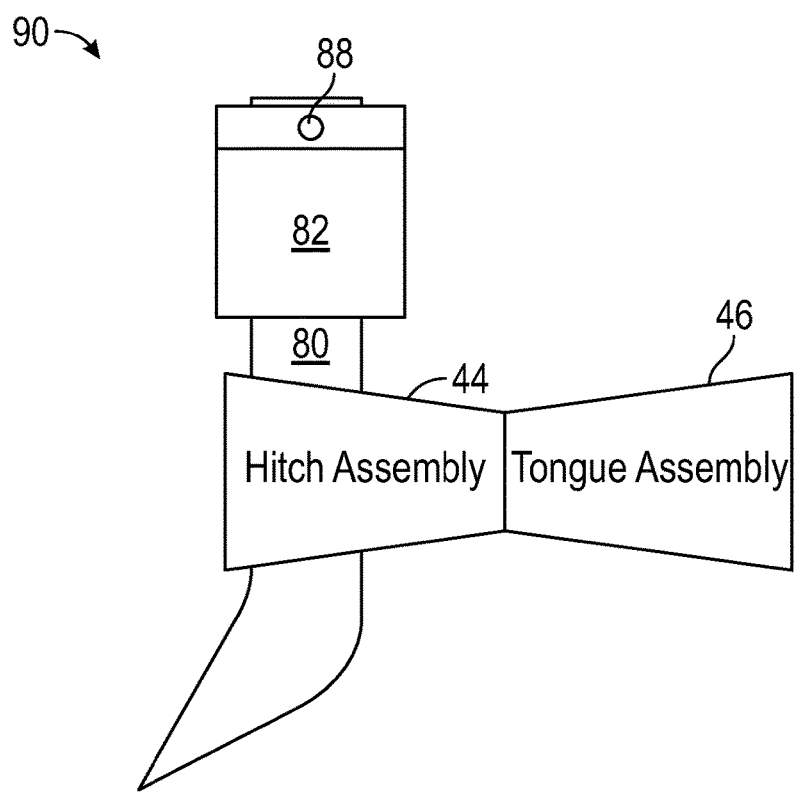
FIG. 7 is a block diagram on example of a portion of the pipe transport system of FIG. 4, which includes a ripper shank assembly, a vehicle hitch assembly, and a tongue assembly, in accordance with an embodiment of the present disclosure.

To help illustrate, an example of a portion 90 of a pipe transport system 38, which includes a hitch assembly 44, is shown in FIG. 7. As depicted, the portion 90 of the pipe transport system 38 additionally includes a ripper shank 80 of a tow vehicle 40, a shank socket 82 of the tow vehicle 40, and a tongue assembly 46 of a pipe trailer 42. In particular, as depicted, the ripper shank 80 is secured in the shank socket 82 via a shank pin 88 inserted through and secured in openings in the shank socket 82 and a corresponding opening in the ripper shank 80. Additionally, as depicted, the hitch assembly 44 is secured (e.g., coupled) to the ripper shank 80 and to the tongue assembly 46.

Figure 8:
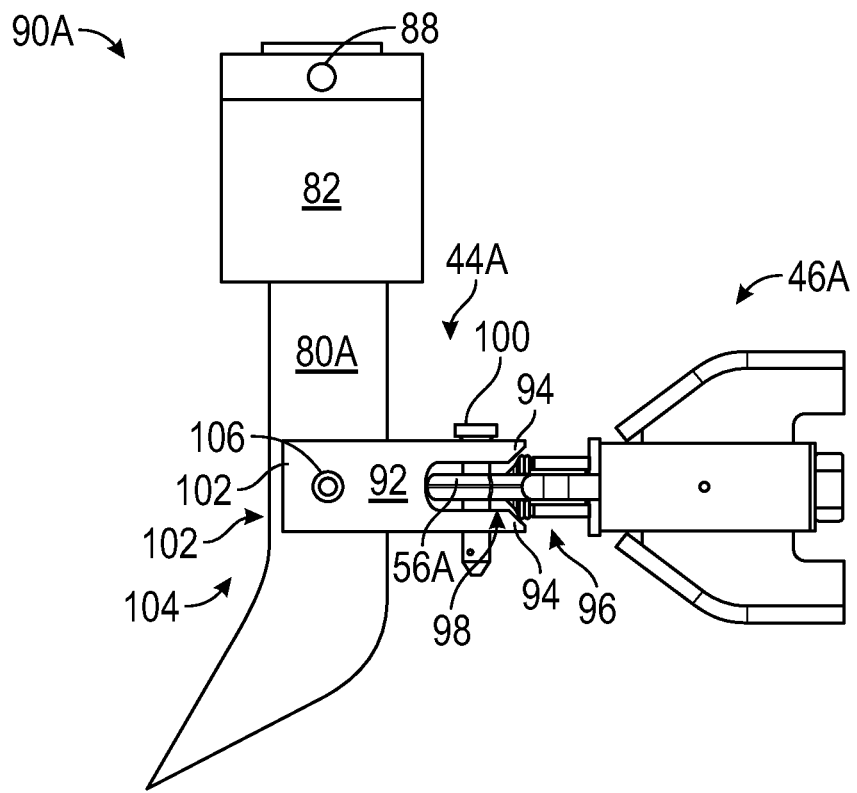
FIG. 8 in a side view of an example of the portion of the pipe transport system of FIG. 7, in accordance with an embodiment of the present disclosure.

To help further illustrate, a more detailed example of the portion 90A of the pipe transport system 38 is shown in FIG. 8. As depicted, a tongue assembly 46A of the pipe transport system 38 includes a trailer coupler (e.g., ring) 56A. In particular, as depicted, the trailer coupler 56A includes a vertical opening, which may be used to facilitate coupling the tongue assembly 46A to a hitch assembly 44A of the pipe transport system 38.

To facilitate coupling the tongue assembly 46A thereto, as depicted, the hitch assembly 44A includes a hitch body 92 with horizontal fins 94 that extend from its first (e.g., rear-facing) side 96 to define a horizontal slit 98, which is to be used to interface with the trailer coupler 56A of the tongue assembly 46A. In particular, as depicted, the horizontal fins 94 each includes a vertical opening, which may be aligned with the vertical opening in the trailer coupler 56A. Thus, as will be described in more detail below, the hitch assembly 44A may be secured to the tongue assembly 46A at least in part by inserting and securing a vertical (e.g., drop and/or first) pin 100 in the vertical openings in the horizontal fins 94 as well as the vertical opening in the trailer coupler 56A. In other words, the hitch assembly 46A of FIG. 8 may be used to implement a drop pin hitch assembly 46A.

Additionally, to facilitate coupling the hitch assembly 44A to a tow vehicle 40, as depicted, the hitch body 92 includes vertical fins 102 that extend from its second (e.g., forward-facing) side 104 to define a vertical slit, which is to be used to interface with the ripper shank 80A of the tow vehicle 40. In particular, as depicted, the vertical fins 102 of the hitch body 92 may each include a horizontal opening, which may be aligned with a corresponding horizontal opening in the ripper shank 80A. Thus, as will be described in more detail below, the hitch assembly 44A may be secured to the ripper shank 80A at least in part by inserting and securing a horizontal (e.g., second) pin 106 in the horizontal openings in the vertical fins 102 as well as the horizontal opening in the ripper shank 80A.

However, in some instances, permanently modifying (e.g., augmenting) even a portion of a tow vehicle 40, such as a ripper shank 80 of the tow vehicle 40, may be undesirable, for example, due to the tow vehicle 40 and a corresponding pipe trailer 42 being owned by different entities. To facilitate reducing permanent modifications to a tow vehicle, in some embodiments, the ripper shank 80A of FIG. 8 may be a special-purpose ripper shank 80A, which includes one or more horizontal openings that are implemented to be aligned with corresponding horizontal openings in the vertical fins 102 of the hitch body 92. In particular, in such embodiments, the special-purpose ripper shank 80A may be secured to the shank socket 82 on the tow vehicle 40 in place of a normal (e.g., typical) ripper shank, for example, via a shank pin 88 inserted through and secured in an opening in the shank socket 82 as well as a corresponding opening in the special-purpose ripper shank 80A.

However, it should be appreciated that the depicted example is merely intended to be illustrative and not limiting. In particular, in other embodiments, a hitch assembly 44 may include multiple horizontal openings in each vertical fin 102 of its hitch body 92 and, thus, secured to a ripper shank 80 using multiple horizontal pins 106. Additionally or alternatively, a hitch assembly 46 may be implemented to provide a different type of trailer hitch, such as a pintle hitch.

Figure 9:
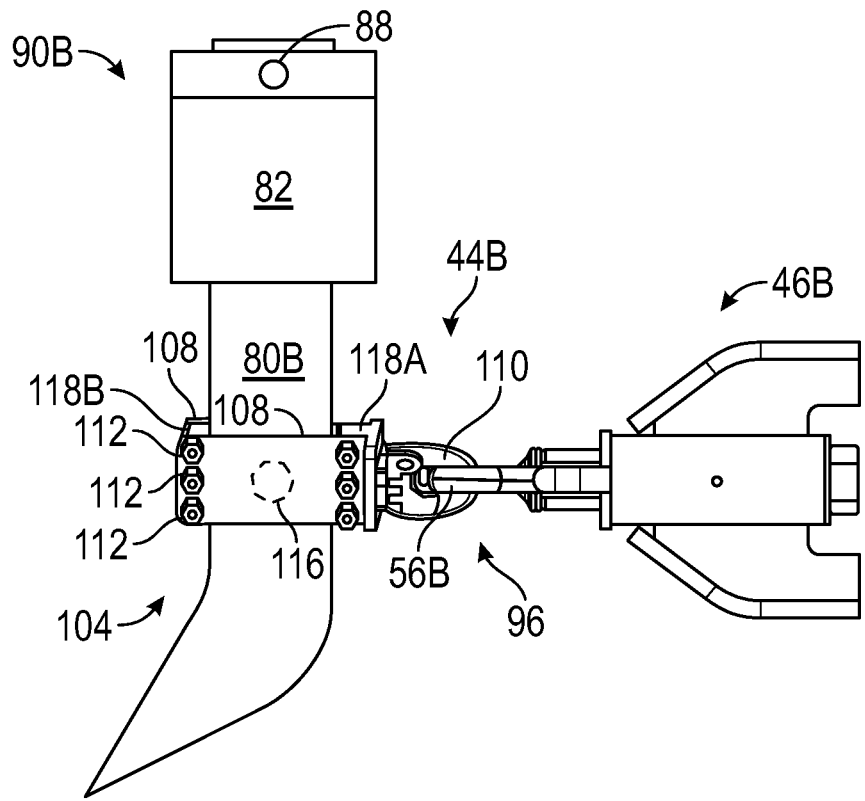
FIG. 9 is a side view of another example of the portion of the pipe transport system of FIG. 7, in accordance with an embodiment of the present disclosure.

To help illustrate, another more detailed example of the portion 90B of the pipe transport system 38 is shown in FIG. 9. As depicted, a tongue assembly 46B of the pipe transport system 38 includes a trailer coupler (e.g., ring) 56B, which has a vertical opening that may be used to facilitate coupling the tongue assembly 46B to a hitch assembly 44B of the pipe transport system 38. In some embodiments, the tongue assembly 46B of FIG. 9 may generally match the tongue assembly 46A of FIG. 8.

To facilitate coupling the hitch assembly 44B to the ripper shank 80B, as depicted in FIG. 9, the hitch assembly 44B includes clamp plates 108 and a trailer hitch 110, which is coupled to a first (e.g., rear-facing) side 96 of the clamp plates 108. In particular, as in the depicted example, in some embodiments, the trailer hitch 110 may be a pintle hitch 110. However, it should be appreciated that the depicted example is merely intended to be illustrative and not limiting. In particular, in other embodiments, a different type of trailer hitch 110, such as a drop pin hitch 110, may be coupled to the clamp plates 108.

In any case, as depicted, the clamp plates 108 may be coupled externally around the ripper shank 80B. In particular, to facilitate securing the hitch assembly 44B to the ripper shank 80B, the clamp plates may be forced (e.g., pushed and/or compressed) toward one another such that the inner surfaces of the clamp plates 108 engage (e.g., contact)

corresponding surfaces of the ripper shank 80B. In other words, in some embodiments, the hitch assembly 44B may be secured to the ripper shank 80B at least in part using the friction between the ripper shank 80 and the inner surfaces of the clamp plates 108, for example, instead of a horizontal pin 106 inserted through and secured in horizontal openings in the hitch assembly 44B and a corresponding horizontal opening in the ripper shank 80B. As such, the hitch assembly 44B may be unsecured from and, thus, removed from a tow vehicle 40 at least in part by disengaging the inner surface of the clamp plates 108 from the ripper shank 80B.

To facilitate selectively engaging its inner surface with the ripper shank 80B, as depicted, the clamp plates 108 includes clamping fastener openings, which each enable a corresponding threaded clamp fastener 112, such as a bolt, to be inserted through and selectively tightened therein. In particular, tightening a threaded clamping fastener 112 may exert force that pulls the clamp plates 108 toward one another, thereby compressing the inner surfaces of the clamp plates 108 against corresponding surfaces of the ripper shank 80B disposed therebetween. On the other hand, loosening a threaded clamp fastener 112 may enable the clamp plates 108 to move away from one another and, thus, their inner surfaces to disengage from corresponding surfaces of the ripper shank 80B.

In fact, to facilitate improving the strength with which the hitch assembly 44B is secured to the ripper shank 80B, in some embodiments, friction enhancement may be implemented on an inner surface of a clamp plate 108. For example, in some such embodiments, friction enhancement may be implemented at least in part by implementing teeth (e.g., serrations) that extend out from the inner surface of the clamp plate 108. Additionally or alternatively, friction enhancement may be implemented at least in part by coating (e.g., covering and/or spraying) the inner surface of the clamp plate 108 with a material that provides a higher friction coefficient than the base material of the clamp plate 108.

To facilitate further improving the strength with which the hitch assembly 44B is secured to the ripper shank 80B, in some embodiments, a clamp plate 108 of the hitch assembly 44B may additionally include one or more friction fastener openings, which are each implemented to enable a corresponding threaded friction fastener 116, such as a such as a set screw (e.g., a die point screw, a dog point screw, a rolled point screw, a cupped point screw, a round point screw, or the like), another type of screw, or a bolt, to be inserted therethrough. In particular, in such embodiments, tightening a threaded friction fastener 116 may cause the head of the threaded friction fastener 116 to pass through the friction fastener opening in the clamp plate 108 and engage a corresponding surface of the ripper shank 80B, thereby increasing the friction between the hitch assembly 44B and the ripper shank 80B. On the other hand, loosening the threaded friction fastener 116 may cause the head of the threaded friction fastener 116 to disengage from the ripper shank 80B, thereby reducing the friction between the hitch assembly 44B and the ripper shank 80B.

Additionally or alternatively, to facilitate distributing forces exerted on the clamp plates 108 more uniformly (e.g., evenly), in some embodiments, the hitch assembly 44B may include one or more spacer plates 118, which are each implemented to be coupled between inner surfaces of the clamp plates 108. For example, the hitch assembly 44B may include a spacer plate 118A coupled between the first (e.g., rear-facing) sides 96 of the clamp plates 108. In fact, as in the depicted example, in some embodiments, the trailer hitch 110 may be coupled to the clamp plates 108 via the spacer plate 118A coupled between the first sides 96 of the clamp plates 108. Additionally or alternatively, the hitch assembly 44B may include a spacer plate 118B coupled between a second (e.g., forward-facing and/or opposite) side 104 of the clamp plates 108.

In any case, in some such embodiments, a spacer plate 118 of the hitch assembly 44B may be implemented with a thickness that is slightly less than the default (e.g., original, initial, and/or uncompressed) thickness of the ripper shank 80B. In other words, when the inner surfaces of the clamp plates 108 initially engage the ripper shank 80B, in such embodiments, open space may remain between clamp plates 108 and the spacer plate 118 to enable the clamp plates 108 to be further tightened around the ripper shank 80B. In fact, such embodiments may enable the hitch assembly 44B to be secured at different locations on the ripper shank 80, for example, to facilitate aligning the hitch assembly 44B with the tongue assembly 46B. In this manner, a hitch assembly 44 may be deployed at a tow vehicle 40, such as a dozer that does not otherwise include a trailer hitch 110, to enable the tow vehicle 40 to be used in a pipe transport system 38, which, at least in some instances, may facilitate improving pipe transport efficiency provided by the pipe transport system 38.

Figure 10:
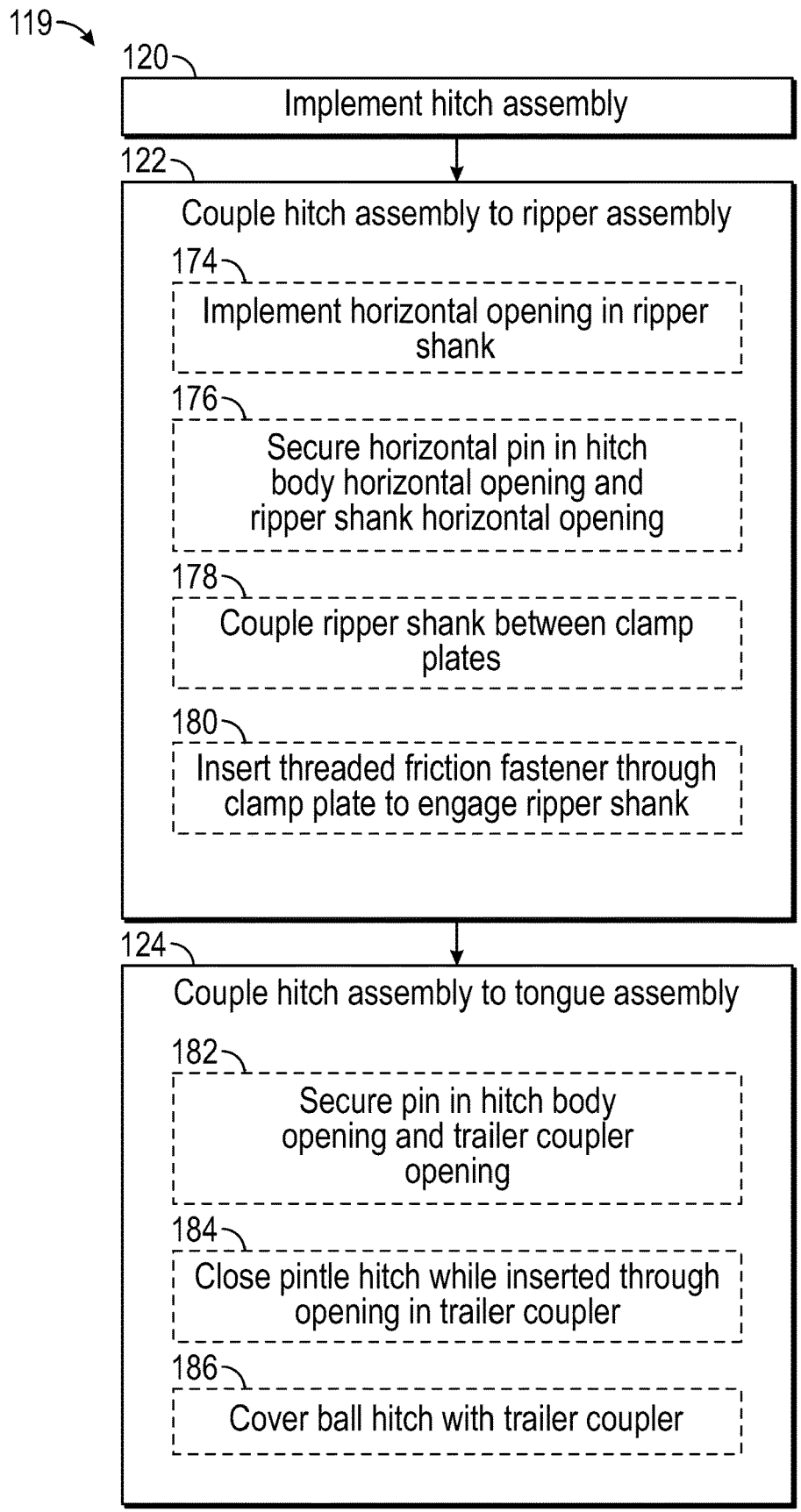
FIG. 10 is flow diagram of an example process for implementing the portion of the pipe transport system of FIG. 7, in accordance with an embodiment of the present disclosure.

To help further illustrate, an example of a process 118 for implementing a pipe transport system 38 is described in FIG. 10. Generally, the process 118 includes implementing a hitch assembly (process block 120) and coupling the hitch assembly to a ripper assembly (process block 122). Additionally, the process 118 includes coupling the hitch assembly to a tongue assembly (process block 124).

Although described in a specific order, which corresponds with an embodiment of the present disclosure, it should be appreciated that the example process 118 is merely intended to be illustrative and not limiting. In particular, in other embodiments, a process 118 for implementing a pipe transport system 38 may include one or more additional process blocks and/or omit one or more of the depicted process blocks. Additionally or alternatively, in other embodiments, one or more of the depicted process blocks may be performed in a different order, for example, such that the hitch assembly 44 is coupled to the tongue assembly 46 before the hitch assembly 44 is coupled to the ripper assembly 78.

In any case, as described above, a pipe transport system 38 may include a hitch assembly 44, which is implemented to be deployed at a tow vehicle 40 to enable the tow vehicle 40 to be coupled to and, thus, move (e.g., tow) a corresponding pipe trailer 42. As such, implementing the pipe transport system 38 may include implementing a hitch assembly 44, which is to be deployed at a tow vehicle 40 (process block 120). In particular, as described above with regard to FIG. 8, in some embodiments, a hitch assembly 44 may be implemented to be secured to a ripper shank 80 of a tow vehicle 40 via a horizontal pin 106 that is inserted through and secured in a horizontal opening in the ripper shank 80 and corresponding horizontal openings in the hitch assembly 44.

Figure 11:
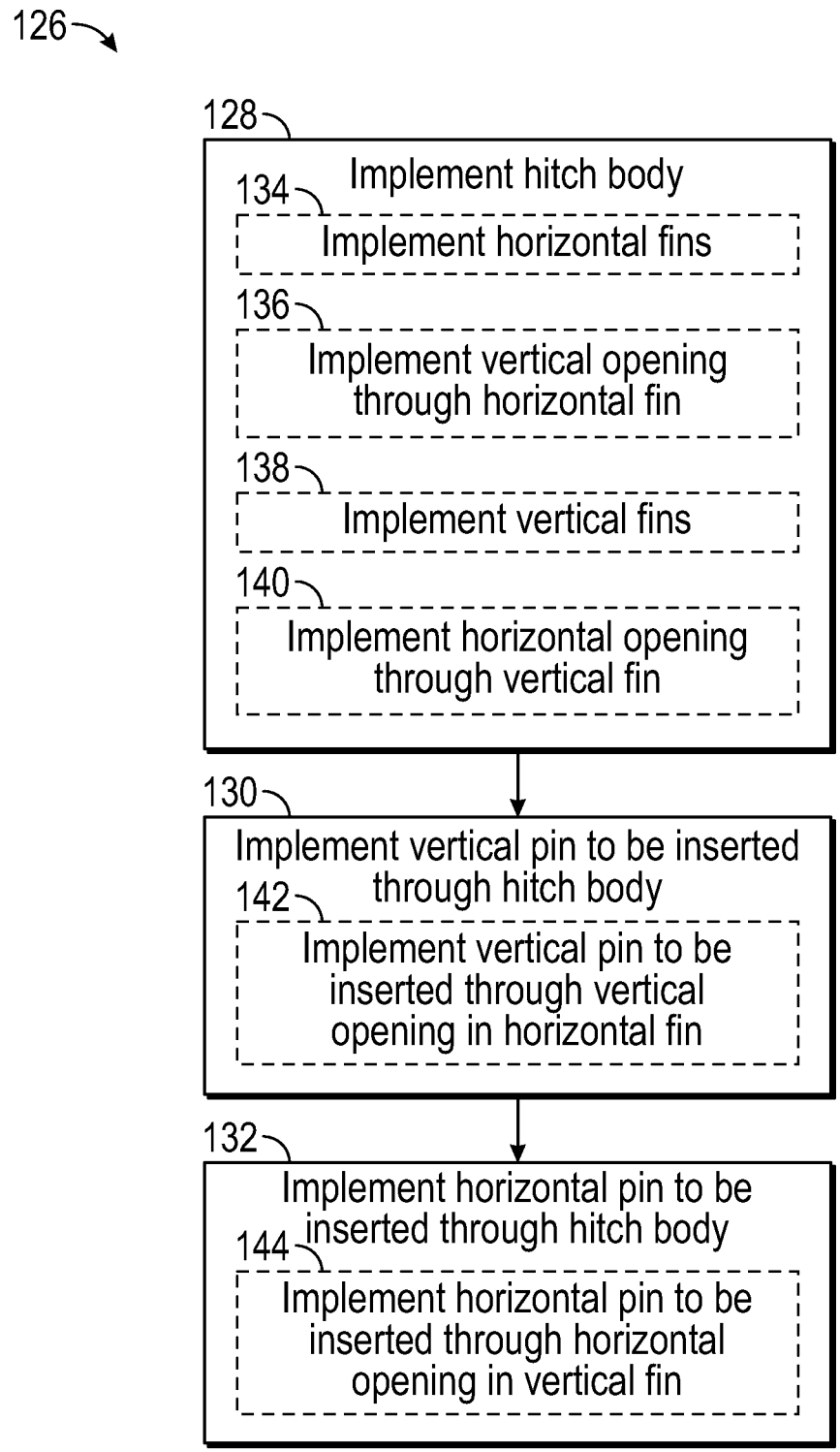
FIG. 11 is a flow diagram of an example process for implementing the vehicle hitch assembly of FIG. 8, in accordance with an embodiment of the present disclosure.

To help further illustrate, an example of a process 126 for implementing a hitch assembly 44 is described in FIG. 11. Generally, the process 126 includes implementing a hitch body (process block 128). Additionally, the process 126 generally includes implementing a vertical pin to be inserted through the hitch body (process block 130) and implementing a horizontal pin to be inserted through the hitch body (process block 132).

Although described in a specific order, which corresponds with an embodiment of the present disclosure, it should be appreciated that the example process 126 is merely intended to be illustrative and not limiting. In particular, in other embodiments, a process 126 for implementing a hitch assembly 44 may include one or more additional process blocks and/or omit one or more of the depicted process blocks. Additionally or alternatively, in other embodiments, one or more of the depicted process blocks may be performed in a different order, for example, such that the horizontal pin 106 is implemented before the vertical pin 100.

In any case, as described above with regard to FIG. 8, in some embodiments, a hitch assembly 44 may include a hitch body 92, which is implemented to be coupled to a ripper shank 80 of a tow vehicle 40 and to a tongue assembly 46 on a pipe trailer 42. Thus, as described in FIG. 11, in such embodiments, implementing the hitch assembly 44 may include implementing a hitch body 92, which is to be coupled to the ripper shank 80 of the tow vehicle 40 as well as the tongue assembly 46 on the pipe trailer 42 (process block 128). More specifically, in some embodiments, the hitch body 92 may be implemented at least in part by milling the hitch body 92 from a block of material, such as metal. Additionally or alternatively, the hitch body 92 may be implemented at least in part by deforming (e.g., bending and/or molding) material, such as metal or plastic.

As described above, to facilitate securing a hitch assembly 44 to a tongue assembly 46 on a pipe trailer 42, in some embodiments, the hitch body 92 of the hitch assembly 44 may include horizontal fins 94 implemented to extend from its first (e.g., rear-facing) side 96 to define a horizontal slit 98, which is to be used to interface with a trailer coupler 56 of the tongue assembly 46. In particular, to facilitate securing the hitch body 92 to the tongue assembly 46, in some such embodiments, the horizontal fins 94 may each be implemented with a vertical opening, which may be aligned with a vertical opening in the trailer coupler 56 of the tongue assembly 46 to enable a vertical (e.g., drop) pin 100 to be inserted and secured therein. In other words, in such embodiments, implementing the hitch body 92 may include implementing horizontal fins 94 that each extend from the first side 96 of the hitch body 92 (process block 134) and implementing a vertical opening through each of the horizontal fins 94 (process block 136).

Additionally, as described above, to facilitate securing the hitch assembly 44 to the ripper shank 80 on the tow vehicle 40, in some embodiments, the hitch body 92 may include vertical fins 102 implemented to extend from its second (e.g., front-facing and/or opposite) side 104 to define a vertical slit, which is to be used to interface with the ripper shank 80. In particular, to facilitate securing the hitch body 92 to the ripper shank 80, in some such embodiments, the vertical fins 102 may each be implemented with a horizontal opening, which may be aligned with a horizontal opening in the ripper shank 80 to enable a horizontal pin 106 to be inserted and secured therein. In other words, in such embodiments, implementing the hitch body 92 may include implementing vertical fins 102 that each extend from the second side 104 of the hitch body 92 (process block 138) and implementing a horizontal opening in each of the vertical fins 102 (process block 140).

Furthermore, as described above with regard to FIG. 8, to facilitate securing the hitch body 92 of a hitch assembly 44 to the trailer coupler 56 of a tongue assembly 46, in some embodiments, the hitch assembly 44 may include a vertical pin 100 that is implemented to be inserted through the hitch body 92 and the trailer coupler 56. Thus, as described in FIG. 11, in such embodiments, implementing the hitch assembly 44 may include implementing a vertical pin 100 to be inserted through the hitch body 92 (process block 130). In particular, as described above, in some embodiments, the vertical pin 100 may be implemented to be inserted and secured in vertical openings in the horizontal fins 94 as well as a corresponding vertical opening in the trailer coupler 56. In other words, in such embodiments, implementing the hitch assembly 44 may include implementing a vertical pin 100 to be inserted through a vertical opening in a horizontal fin 94 of the hitch body 92 (process block 142).

Moreover, as described above with regard to FIG. 8, to facilitate securing the hitch body 92 to the ripper shank 80, in some embodiments, the hitch assembly 44 may include a horizontal pin 106 that is implemented to be inserted through the hitch body 92 and the ripper shank 80. Thus, as described in FIG. 11, in such embodiments, implementing the hitch assembly 44 may include implementing a horizontal pin 106 to be inserted through the hitch body 92 (process block 132). In particular, as described above, in some embodiments, the horizontal pin 106 may be implemented to be inserted and secured in horizontal openings in the vertical fins 102 as well as a corresponding horizontal opening in the ripper shank 80. In other words, in such embodiments, implementing the hitch assembly 44 may include implementing a horizontal pin 106 to be inserted through a horizontal opening in a vertical fin 102 of the hitch body 92 (process block 144).

In this manner, a hitch assembly 44 to be secure to a ripper shank 80 via a horizontal opening in the ripper shank 80 may be implemented. At least in some instances, implementing (e.g., forming, milling, and/or drilling) the horizontal opening in a ripper shank 80 may effectively modify the ripper shank 80 permanently. However, in some instances, permanently modifying even a portion of a tow vehicle 40, such as a ripper shank 80 of the tow vehicle 40, may be undesirable, for example, due to the tow vehicle 40 and a corresponding pipe trailer 42 being owned by different entities. To facilitate reducing permanent modification, as described above with regard to FIG. 9, in some embodiments, a hitch assembly 44 may be implemented to be secured externally around a ripper shank 80 of a tow vehicle 40.

Figure 12:
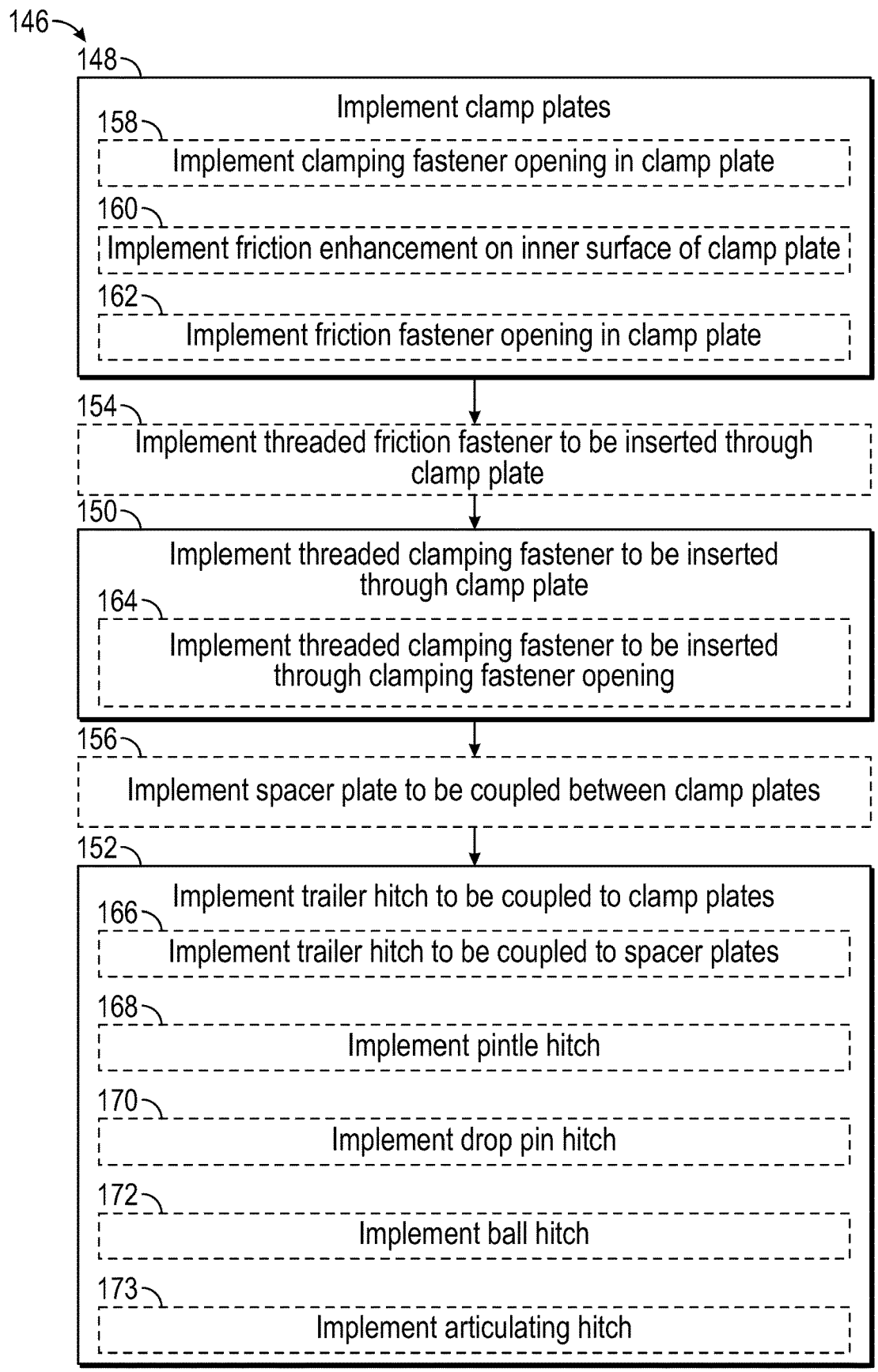
FIG. 12 is a flow diagram of an example process for implementing the vehicle hitch assembly of FIG. 9, in accordance with an embodiment of the present disclosure.

To help further illustrate, another example of a process 146 for implementing a hitch assembly 44 is described in FIG. 12. Generally, the process 146 includes implementing clamp plates (process block 148). Additionally, the process 146 generally includes implementing a threaded clamping fastener to be inserted through a clamp plate (process block 150) and implementing a trailer hitch to be coupled to the clamp plates (process block 152).

Although described in a specific order, which corresponds with an embodiment of the present disclosure, it should be appreciated that the example process 146 is merely intended to be illustrative and not limiting. In particular, in other embodiments, a process 146 for implementing a hitch assembly 44 may include one or more additional process blocks and/or omit one or more of the depicted process blocks. For example, some embodiments of the process 146 may additionally include implementing a threaded friction fastener to be inserted through a clamp plate (process block 154) while other embodiments of the process 146 do not. Additionally or alternatively, some embodiments of the process 146 may additionally include implementing a spacer plate to be coupled between the clamp plates (process block 156) while other embodiments of the process 146 do not.

In any case, as described above with regard to FIG. 9, in some embodiments, a hitch assembly 44 may include clamp plates 108, which are implemented to be coupled externally around a ripper shank 80 of a tow vehicle 40. Thus, as described in FIG. 12, in such embodiments, implementing the hitch assembly 44 may include implementing clamp plates 108, which are to be coupled externally around the ripper shank 80 of the tow vehicle 40 (process block 148). More specifically, in some embodiments, a clamp plate 108 of the hitch assembly 44 may be implemented at least in part by milling the clamp plate 108 from a block of material, such as metal. Additionally or alternatively, the clamp plate 108 may be implemented at least in part by deforming (e.g., bending and/or molding) material, such as metal or plastic.

As described above, to facilitate securing the clamp plates 108 to the ripper shank 80, the clamp plates 108 may be forced toward one another such that an inner surface of one or more of the clamp plates 108 engages (e.g., contacts) a corresponding surface of the ripper shank 80. To facilitate selectively forcing the clamp plates 108 toward one another, in some embodiments, the clamp plates 108 may include one or more clamping fastener openings, which are each implemented to enable a corresponding threaded clamping fastener, such as a bolt, to inserted and selectively tightened therein. In other words, in such embodiments, implementing the clamp plates 108 may include implementing one or more clamping fastener openings in each clamp plate 108 (process block 158). In this manner, the hitch assembly 44 may be secured to a ripper shank 80 of a tow vehicle 40 at least in part using the friction between inner surfaces of the clamp plate 108 and corresponding surfaces of the ripper shank 80.

In fact, to facilitate improving the strength with which the hitch assembly 44 is secured to the ripper shank 80, in some embodiments, one or more friction enhancements may be implemented on an inner surface of a clamp plate 108 (process block 160). For example, in some such embodiments, a friction enhancement may be implemented at least in part by implementing one or more teeth (e.g., serrations) that extend out from the inner surface of the clamp plate 108. Additionally or alternatively, a friction enhancement may be implemented at least in part by implementing covering (e.g., coating and/or spraying) the inner surface of the clamp plate 108 with a material that provides a higher friction coefficient than the base material of the clamp plate 108.

To facilitate further improving the strength with which the hitch assembly 44 is secured to the ripper shank 80, in some embodiments, the clamp plates 108 may include one or more friction fastener openings, which are each implemented to enable a corresponding threaded friction fastener 116, such as a set screw (e.g., a die point screw, a dog point screw, a rolled point screw, a cupped point screw, a round point screw, or the like), to be inserted and selectively tightened therein. In other words, in such embodiments, implementing the clamp plates 108 may include implementing one or more friction fastener openings in a clamp plate 108 (process block 162). Additionally, in such embodiments, implementing the hitch assembly 44 may include implementing a threaded friction fastener 116, which is to be inserted through a friction fastener opening in a clamp plate 108 to engage a corresponding surface of the ripper shank 80 (process block 154).

Additionally, as described above with regard to FIG. 9, to facilitate selectively securing the clamp plates 108 of the hitch assembly 44 to the ripper shank 80, in some embodiments, the hitch assembly 44 may include one or more threaded clamping fasteners 112, such as a bolt, which are each implemented to be selectively inserted and tightened in corresponding clamping fastener openings of the clamp plates 108. Thus, as described in FIG. 12, in such embodiments, implementing the hitch assembly 44 may include implementing one or more threaded clamping fasteners 112 to be inserted through the clamp plates 108 (process block 150). In particular, in some such embodiments, implementing the hitch assembly 44 may include implementing a threaded clamping fastener 112 to be inserted through a corresponding clamping fastener opening in the clamp plate 108 (process block 164).

Furthermore, as described above with regard to FIG. 9, to facilitate distributing force exerted on the clamp plates 108 more uniformly (e.g., evenly), in some embodiments, the hitch assembly 44 may include one or more spacer plates 118, which are each implemented to be coupled between its clamp plates 108. For example, the hitch assembly 44 may include a spacer plate 118A, which is implemented to be coupled between a first (e.g., rear) side 96 of the clamp plates 108, and another spacer plate 118B, which is implemented to be coupled between a second (e.g., front) side 104 of the clamp plates 108. Thus, as described in FIG. 12, in such embodiments, implementing the hitch assembly 44 may include implementing one or more spacer plates 118, which are to be coupled between its clamp plates 108 (process block 156).

More specifically, in some embodiments, a spacer plate 118 of the hitch assembly 44 may be implemented at least in part by milling the spacer plate 118 from a block of material, such as metal. Additionally or alternatively, the spacer plate 118 may be implemented at least in part by deforming (e.g., bending and/or molding) material, such as metal or plastic. In any case, as described above, in some embodiments, a spacer plate 118 may be implemented with a thickness that is less than a default (e.g., original, initial, and/or uncompressed) thickness of the ripper shank 80, for example, to enable the clamp plates 108 to be forced closer together even after they initially engage the ripper shank 80.

In any case, as described above with regard to FIG. 9, in some embodiments, a trailer hitch 110 of the hitch assembly 44 may be implemented to be coupled to its clamp plates 108. Thus, as described in FIG. 12, in such embodiments, implementing the hitch assembly 44 may include implementing a trailer hitch 110 to be coupled to its clamp plates 108 (process block 152). In fact, as described above, in some such embodiments, the trailer hitch 110 may be implemented to be coupled to the clamp plates 108 via a spacer plate 118 (process block 166).

Moreover, as described above with regard to FIG. 9, in some embodiments, a trailer hitch 110 included in the hitch assembly 44 may be a pintle hitch 110. Thus, as described in FIG. 12, in such embodiments, implementing the trailer hitch 110 may include implementing a pintle hitch 110 (process block 168). However, in other embodiments, the hitch assembly 44 may include a different type of trailer hitch 110. For example, in some embodiments, the trailer hitch 110 included in the hitch assembly 44 may be a drop pin hitch 110 and, thus, implementing the trailer hitch 110 may include implementing a drop pin hitch 110 (process block 170). In further embodiments, the trailer hitch 110 included in the hitch assembly 44 may be a ball hitch 110 and, thus, implementing the trailer hitch 110 may include implementing a ball hitch 110 (process block 172). In still further embodiments, the trailer hitch 110 included in the hitch assembly 44 may be an articulating hitch 110 and, thus, implementing the trailer hitch 110 may include implementing an articulating hitch 110 (process block 173). In this manner, a hitch assembly 44 to be secured externally around a ripper shank 80 may be implemented.

Returning to the process 118 of FIG. 10, the hitch assembly 44 may then be coupled (e.g., secured) to a ripper assembly 78, for example, which is coupled to the vehicle frame 66 of the tow vehicle 40 (process block 122). In particular, as described above with regard to FIG. 8, in some embodiments, the hitch assembly 44 may be secured to a ripper shank 80 of the ripper assembly 78 via a horizontal pin 106 inserted through and secured in horizontal openings in the hitch body 92 of the hitch assembly 44 as well as a corresponding horizontal opening implemented in the ripper shank 80. Thus, as described in FIG. 10, in such embodiments, coupling the hitch assembly 44 to the ripper assembly 78 may include implementing (e.g., forming, drilling, and/or milling) a horizontal opening in the ripper shank 80 (process block 174) as well as securing a horizontal pin 106 in the horizontal openings in the hitch body 92 and the corresponding horizontal opening in the ripper shank 80 (process block 176).

Additionally, as described above with regard to FIG. 9, in some embodiments, the hitch assembly 44 may be secured to a ripper shank 80 of the ripper assembly 78 at least in part via clamp plates 108 coupled externally around the ripper shank 80. Thus, as described in FIG. 10, in such embodiments, coupling the hitch assembly 44 to the ripper assembly 78 may include coupling (e.g., securing) the ripper shank 80 between the clamp plates 108 of the hitch assembly 44, for example, at least in part by tightening a threaded clamping fastener 112, such as a bolt (process block 178). Furthermore, as described above with regard to FIG. 9, in some embodiments, the hitch assembly 44 may be secured to a ripper shank 80 of the ripper assembly 78 at least in part via a threaded friction fastener 116, such as a set screw (e.g., a die point screw, a dog point screw, a rolled point screw, a cupped point screw, a round point screw, or the like), that is inserted through the clamp plate 108 to engage a corresponding surface of the ripper shank 80. Thus, as described in FIG. 10, in such embodiments, coupling the hitch assembly 44 to the ripper assembly 78 may include inserting one or more threaded friction fasteners 116 through the clamp plates 108 to engage corresponding surfaces of the ripper shank 80 (process block 180).

After being coupled to the tow vehicle 40 via its ripper assembly 78, the hitch assembly 44 may be coupled (e.g., secured) to a tongue assembly 46 on the pipe trailer 42 (process block 124). In particular, as described above with regard to FIG. 8, in some embodiments, the hitch assembly 44 may be secured to a trailer coupler 56 of the tongue assembly 46 via a vertical (e.g., drop) pin 100 inserted through and secured in a vertical opening in the trailer coupler 56 as well as vertical openings in the hitch body 92, which are implemented to be aligned with the vertical opening in the trailer coupler 56. Thus, as described in FIG. 10, in such embodiments, coupling the hitch assembly 44 to the tongue assembly 46 may include securing a pin (e.g., vertical pin 100) in in openings (e.g., vertical openings) in the hitch body 92 and a corresponding opening (e.g., vertical opening) in the trailer coupler 56 (process block 182).

Additionally, as described above with regard to FIG. 9, in some embodiments, the hitch assembly 44 may include a pintle hitch 110. In particular, in such embodiments, the pintle hitch 110 of the hitch assembly 44 may be coupled to the tongue assembly 46 via an (e.g., vertical) opening in a trailer coupler 56 of the tongue assembly 46. Thus, as described in FIG. 10, in such embodiments, coupling the hitch assembly 44 to the tongue assembly 46 may include closing the pintle hitch 110 of the hitch assembly 44 while the pintle hitch 110 is inserted through the opening in the trailer coupler 56 of the tongue assembly 46 (process block 184).

Furthermore, as described above, in other embodiments, the hitch assembly may include a different type of trailer hitch 110. For example, in some other embodiments, the hitch assembly 44 may include a ball hitch 110. Thus, as described in FIG. 10, in such embodiments, coupling the hitch assembly 44 to the tongue assembly 46 may include covering the ball hitch 110 of the hitch assembly 44 with the trailer coupler 56 of the tongue assembly 46 (process block 186).

In this manner, the techniques described in the present disclosure may facilitate implementing and/or deploying a trailer hitch at a tow vehicle, such as a dozer, that does not otherwise include a trailer hitch. In particular, as described above, implementing and/or deploying the trailer hitch in accordance with the techniques described in the present disclosure may facilitate improving pipe transportation efficiency (e.g., flexibility and/or reliability) to and/or within a pipeline system, for example, at least in part by increasing the types of vehicles that may be used as a tow vehicle in a pipe transport system and/or reducing the likelihood of a trailer hitch breaking off from the tow vehicle. In fact, in some embodiments, a ripper assembly of a tow vehicle may include one or more actuators (e.g., hydraulic cylinders), which are implemented and/or operated to move its ripper shank. Thus, in such embodiments, the one or more actuators of the ripper assembly may additionally be used to move a hitch assembly coupled to the ripper shank and, thus, a pipe trailer coupled to the hitch assembly, which, at least in some instances, may facilitate further improving pipe transport efficiency to and/or within a pipeline system, for example, by enabling the pipe trailer and, thus, one or more pipe segments loaded onto the pipe trailer to be moved while the tow vehicle itself remains stationary.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe transport system comprising:
    a tow vehicle configured to move a pipe trailer on which a pipe segment is loaded, wherein:
        the pipe segment comprises tubing that defines a pipe bore and a fluid conduit implemented in an annulus of the tubing; and
        the tow vehicle comprises a ripper assembly having a ripper shank; and
    a hitch assembly configured to be secured to the ripper shank of the tow vehicle to enable the tow vehicle to be coupled to a trailer coupler of a tongue assembly implemented on the pipe trailer, wherein the hitch assembly comprises:
        clamp plates configured to be coupled externally around the ripper shank, wherein the clamp plates are configured to be forced toward one another to enable a clamp plate inner surface to engage a corresponding surface of the ripper shank; and
        a trailer hitch configured to be coupled to a rear side of the clamp plates.

2. The pipe transport system of claim 1, wherein the tow vehicle comprises a vehicle frame, wherein:

the ripper assembly is configured to be coupled to the vehicle frame; and the tow vehicle does not include a trailer hitch integrated with the vehicle frame.

3. The pipe transport system of claim 2, wherein the tow vehicle comprises a blade assembly, wherein:

the blade assembly comprises a dozer blade;

the blade assembly is configured to be coupled to a front side of the vehicle frame; and the ripper assembly is configured to be coupled to a rear side of the vehicle frame.

4. The pipe transport system of claim 1, wherein the hitch assembly comprises:

a first spacer plate configured to be coupled between a front side of the clamp plates, wherein thickness of the first spacer plate is less than a default thickness of the ripper shank; and a second spacer plate configured to be coupled between the rear side of the clamp plates, wherein the trailer hitch is configured to be coupled to the rear side of the clamp plates via the second spacer plate.

5. The pipe transport system of claim 1, wherein the trailer hitch of the hitch assembly comprises a pintle hitch, a drop pin hitch, or a ball hitch.

6. The pipe transport system of claim 1, wherein the clamp plates of the hitch assembly comprise:

one or more teeth that extend out from the clamp plate inner surface;

a coating of material on the clamp plate inner surface that provides a higher coefficient of friction compared to a base material of the clamp plates; or both.

7. The pipe transport system of claim 1, wherein the hitch assembly comprises a friction fastener opening that extends through a clamp plate of the clamp plates to enable a threaded friction fastener to be selectively tightened in the friction fastener opening, wherein:

tightening the threaded friction fastener in the friction fastener opening is configured to cause a head of the threaded friction fastener to pass through the clamp plate and engage a corresponding surface of the ripper shank to facilitate securing the hitch assembly to the tow vehicle; and loosening the threaded friction fastener in the friction fastener opening is configured to cause the head of the threaded friction fastener to disengage from the corresponding surface of the ripper shank to facilitate removing the hitch assembly from the tow vehicle.

8. The pipe transport system of claim 1, wherein the hitch assembly comprises a clamping fastener opening that extends through each of the clamp plates to enable a threaded clamping fastener to be selectively tightened in the clamping fastener opening, wherein:

tightening the threaded clamp fastener in the clamp fastener opening is configured to force the clamp plates toward one another to facilitate securing the hitch assembly to the tow vehicle; and loosening the threaded clamp fastener in the clamp fastener opening is configured to enable the clamp plates to move away from one another to facilitate removing the hitch assembly from the tow vehicle.

9. A pipe transport system comprising a hitch assembly configured to be deployed on a tow vehicle, wherein the hitch assembly comprises:

a first clamp plate and a second clamp plate configured to be coupled around a ripper shank of the tow vehicle, wherein:

the first clamp plate comprises a first inner surface configured to engage a first surface of the ripper shank when the first clamp plate is forced toward the second clamp plate to facilitate securing the hitch assembly to the ripper shank;

the second clamp plate comprises a second inner surface configured to engage a second surface of the ripper shank when the second clamp plate is forced toward the first clamp plate to facilitate securing the hitch assembly to the ripper shank;

a first spacer plate configured to be coupled between a front side of the first clamp plate and the second clamp plate, wherein the first spacer plate is implemented with a thickness that is less than a default thickness of the ripper shank; and a second spacer plate configured to be coupled between a rear side of the first clamp plate and the second clamp plate; and a pintle hitch configured to be coupled to the rear side of the first clamp plate and the second clamp plate via the second spacer plate to enable the hitch assembly to be coupled to a tongue assembly on a pipe trailer.

10. The pipe transport system of claim 9, wherein the hitch assembly comprises a fastener opening that extends through the first clamp plate and the second clamp plate, wherein:

tightening a threaded fastener in the fastener opening is configured to force the first clamp plate and the second clamp plate toward one another; and loosening the threaded fastener in the fastener opening is configured to enable the first clamp plate and the second clamp plate to move away from one another.

11. A pipe transport system comprising:

a tow vehicle configured to move a pipe trailer on which a pipe segment is loaded, wherein:

the pipe segment comprises tubing that defines a pipe bore and a fluid conduit implemented in an annulus of the tubing; and the tow vehicle comprises a ripper assembly having a ripper shank; and a hitch assembly configured to be secured to the ripper shank of the tow vehicle to enable the tow vehicle to be coupled to a trailer coupler of a tongue assembly implemented on the pipe trailer, wherein the hitch assembly comprises a hitch body having:

horizontal fins that extend from a rear side of the hitch body to define a horizontal slit configured to interface with the trailer coupler of the tongue assembly; and vertical fins that extend from a front side of the hitch body to define a vertical slit configured to interface with the ripper shank of the ripper assembly.

12. The pipe transport system of claim 11, wherein the hitch body comprises:

a vertical opening that extends through each of the horizontal fins to enable a vertical pin to be inserted through the hitch body and the ripper shank; and a horizontal opening that extends through each of the vertical fins to enable a horizontal pin to be inserted through the hitch body and the ripper shank.

* * * * *